(12) United States Patent
Han et al.

(10) Patent No.: US 11,924,255 B2
(45) Date of Patent: Mar. 5, 2024

(54) DATA TRANSMISSION METHOD AND APPARATUS, SERVER, STORAGE MEDIUM, AND PROGRAM PRODUCT

(71) Applicant: Tencent Technology (Shenzhen) Company Limited, Shenzhen (CN)

(72) Inventors: Rui Han, Shenzhen (CN); Honghao Liu, Shenzhen (CN); Jianjun Xiao, Shenzhen (CN); Fucai Zhang, Shenzhen (CN); Nian Wen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/140,169

(22) Filed: Apr. 27, 2023

(65) Prior Publication Data

US 2023/0269281 A1   Aug. 24, 2023

Related U.S. Application Data

(63) Continuation of application No. PCT/CN2022/099987, filed on Jun. 21, 2022.

(30) Foreign Application Priority Data

Jul. 21, 2021 (CN) .......................... 202110827938.0

(51) Int. Cl.
*G06F 15/16* (2006.01)
*H04L 65/1095* (2022.01)
*H04L 65/75* (2022.01)
*H04L 69/327* (2022.01)

(52) U.S. Cl.
CPC ........ *H04L 65/1095* (2022.05); *H04L 65/762* (2022.05); *H04L 69/327* (2013.01)

(58) Field of Classification Search
CPC .. H04L 65/1095; H04L 65/762; H04L 69/327
USPC .......................................... 709/219, 223, 226
See application file for complete search history.

(56) References Cited

FOREIGN PATENT DOCUMENTS

| CN | 1758722 A | * | 4/2006 | ............. H04N 19/61 |
|---|---|---|---|---|
| CN | 104918125 A | * | 9/2015 | ....... H04N 21/41407 |
| CN | 111316598 A | * | 6/2020 | |
| KR | 20170103582 A | * | 9/2017 | |

(Continued)

*Primary Examiner* — Liang Che A Wang
(74) *Attorney, Agent, or Firm* — Crowell & Moring LLP

(57) ABSTRACT

This application discloses data transmission that includes: dividing to-be-transmitted content into a plurality of data units at a session layer; transmitting the data units to the target terminal device by using a first transmission channel as a responsible channel of the to-be-transmitted content; distributing, by the session layer in a case that the session layer switches the responsible channel of the to-be-transmitted content from the first transmission channel to a second transmission channel with a different transmission protocol, the data units to the second transmission channel; and transmitting the data units distributed by the session layer to the target terminal device through the second transmission channel. In data transmission in this application, the session layer controls switching of the channels and distribution of the data units, so that the transmission sequence is free from constraints of protocols and the degree of freedom in data transmission is increased.

20 Claims, 8 Drawing Sheets

(56) References Cited

FOREIGN PATENT DOCUMENTS

RU         2021101602 A * 7/2022
TR          201920551 A2 * 3/2020

* cited by examiner

DATA TRANSMISSION METHOD AND APPARATUS, SERVER, STORAGE MEDIUM, AND PROGRAM PRODUCT

RELATED APPLICATION

This application is a continuation of International Application No. PCT/CN2022/099987, filed Jun. 21, 2022, which claims priority to Chinese Patent Application No. 202110827938.0, entitled "DATA TRANSMISSION METHOD AND APPARATUS, SERVER, AND STORAGE MEDIUM" and filed with the China National Intellectual Property Administration on Jul. 21, 2021. The contents of International Application No. PCT/CN2022/099987 and Chinese Patent Application No. 202110827938.0 are each incorporated herein by reference in their entirety.

FIELD OF THE TECHNOLOGY

This application relates to the field of data transmission technologies, and in particular, to data transmission.

BACKGROUND OF THE DISCLOSURE

With the advent of the era of big data, the use of various types of data is becoming increasingly popular. Using cloud videos as an example, content of the cloud videos is integrated in a cloud video server, and the cloud video server provides video services, for example, video on demand, livestreaming, video calls, and cloud gaming, for a terminal device of a user.

In the related art, a server is usually based on a multi-channel single-protocol transmission solution. Although the multi-channel transmission solution can provide more feasible alternative channels, effects in improving quality of service are still not significant. Using a multipath TCP (MPTCP) solution as an example, a plurality of transmission control protocol (TCP) channels are established in this solution, and the server divides a to-be-transmitted video stream into a plurality of subflows, and transmits the plurality of subflows through the plurality of TCP channels. FIG. 1 is a schematic diagram of an architecture of an MPTCP transmission solution in a stack. As shown in FIG. 1, TCP 1, TCP 2, . . . , and TCP n of a transmission layer are n different channels in the TCP. FIG. 2 is a schematic diagram of sequential transmission of data packets of a plurality of subflows in an MPTCP transmission solution. As shown in FIG. 2, subflow a, subflow b, subflow c, and subflow d are transmitted through two TCP channels (TCP 1 and TCP 2), seq represents a sequence number of a data packet of a subflow, and ack represents an acknowledgment for allowing transmission of a data packet with a next sequence number. For example, after a data packet with a sequence number of 123 in subflow a is transmitted, an acknowledgment needs to be obtained before a data packet with a sequence number of 124 in subflow b is transmitted through the other TCP channel.

In the MPTCP solution, the plurality of TCP channels share one sequence space. The protocol requires that sequence numbers of data packets transmitted through the plurality of TCP channels increase consecutively. For example, a data packet with a sequence number of x+1 needs to be transmitted to a peer end only in a case that a data packet with a sequence number of x obtains an acknowledgment (namely, an acknowledgment message) from the peer end. This constraint leads to a case that when a packet loss occurs, missing data packets in the middle need to be retransmitted for recovery, and the sequence numbers are not allowed to be inconsecutive. Therefore, when a packet loss occurs in a subflow of one channel, all channels need to wait for transmission. It can be learnt that transmission of video data in the MPTCP solution has a limited degree of freedom, and can hardly meet a requirement of a user for quality of the data transmission service in many scenarios. For example, in a cloud gaming scenario, smoothness of operation of a player is affected; during a video call, obvious frame freezing occurs in a video that a user watches; during livestreaming, the sound and picture of a live streamer that an audience watches are asynchronous. Therefore, increasing the degree of freedom in data transmission and improving quality of the data transmission service have become an urgent problem to be resolved in the current field.

SUMMARY

Embodiments of this application provide a data transmission method and apparatus, a server, a storage medium, and a program product, to increase the degree of freedom in data transmission and improve quality of the data transmission service.

In view of this, an aspect of this application provides a data transmission method, including:

dividing to-be-transmitted content into a plurality of data units at a session layer, the to-be-transmitted content being to be transmitted to a target terminal device;

transmitting the data units distributed by the session layer to the target terminal device by using a first transmission channel as a responsible channel of the to-be-transmitted content;

distributing, by the session layer when the session layer switches the responsible channel of the to-be-transmitted content from the first transmission channel to a second transmission channel, the data units to the second transmission channel, the first transmission channel and the second transmission channel using different transmission protocols at a transmission layer; and transmitting the data units distributed by the session layer to the target terminal device through the second transmission channel.

Another aspect of this application provides a data transmission apparatus, including:

a data unit division module, configured to divide to-be-transmitted content into a plurality of data units at a session layer, the to-be-transmitted content being to be transmitted to a target terminal device;

a transmission module, configured to transmit the data units distributed by the session layer to the target terminal device by using a first transmission channel as a responsible channel of the to-be-transmitted content; and a data unit distribution module, configured to distribute, by the session layer when the session layer switches the responsible channel of the to-be-transmitted content from the first transmission channel to a second transmission channel, the data units to the second transmission channel, the first transmission channel and the second transmission channel using different transmission protocols at a transmission layer; and the transmission module being further configured to transmit the data units distributed by the session layer to the target terminal device through the second transmission channel.

Still another aspect of this application provides a server configured to transmit video data, the server including a processor and a memory:

the memory being configured to store program code and transmit the program code to the processor; and the processor being configured to perform, according to instructions in the program code, the steps of the data transmission method according to the foregoing aspect.

Still another aspect of this application provides a computer-readable storage medium, configured to store program code, the program code being configured to perform the data transmission method according to the foregoing aspect.

Still another aspect of this application provides a computer program product including instructions, the computer program product, when run on a computer, causing the computer to perform the data transmission method according to the foregoing aspect.

As can be seen from the foregoing technical solutions, the embodiments of this application have the following advantages.

In the data transmission method provided in the embodiments of this application, a first transmission channel and a second transmission channel that are connected to a target terminal device are established at a transmission layer, and the two channels use different transmission protocols. Before to-be-transmitted content is transmitted to the target terminal device, the to-be-transmitted content is divided into a plurality of data units at a session layer, and the session layer makes a switching decision on a responsible channel for transmitting the to-be-transmitted content. When the session layer switches the responsible channel from the first transmission channel to the second transmission channel, the session layer distributes the data units to the second transmission channel, and the second transmission channel specifically transmits the data units distributed by the session layer to the target terminal device. Because the transmission protocols of the two transmission channels are different, and the session layer is responsible for dividing and distributing the data units, data transmission can be free from constraints of an intrinsic data sequence number space of a transmission protocol, to facilitate self-management and data distribution of the session layer. Therefore, the data transmission is free from constraints of the same sequence space of a transmission protocol, so that the degree of freedom in transmission is increased, quality of the data transmission service is also effectively improved, and a user corresponding to the target terminal device can experience transmitted content more smoothly. In addition, the multi-channel design can also increase reliability of data transmission.

DESCRIPTION OF EMBODIMENTS

Figure 1:
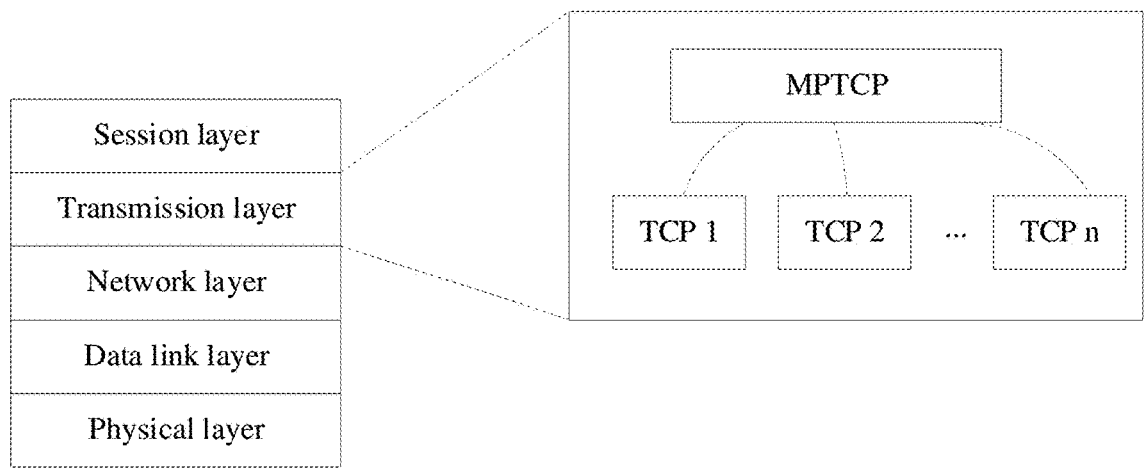
FIG. 1 is a schematic diagram of an architecture of an MPTCP transmission solution in a stack.
Figure 2:
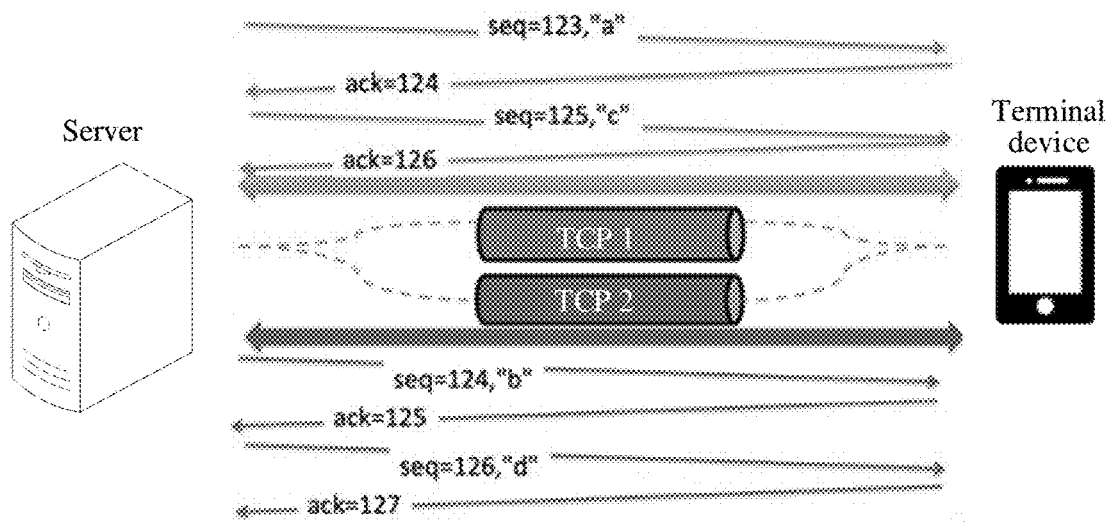
FIG. 2 is a schematic diagram of sequential transmission of data packets of a plurality of subflows in an MPTCP transmission solution.

Currently, in a data transmission service provided for a terminal device corresponding to a user, video data is usually transmitted based on a channel of the same protocol. Single-channel data transmission can obviously hardly cope with transmission problems, and a multi-channel transmission solution therefore emerges. An MPTCP solution is a multi-channel transmission solution. In the MPTCP transmission solution, because of constraints of protocols, each TCP channel transmits a data packet by following the same sequence number space. A data packet with a next sequence number is not allowed to be transmitted until a currently transmitted data packet obtains an acknowledgment from a peer end. Therefore, transmitting data through the MPTCP solution has a low degree of freedom, which affects quality of the data transmission service provided for a user.

To resolve the foregoing problem, this application provides a data transmission method and apparatus, a server, and a storage medium. The data transmission method is introduced below with reference to an actual application scenario.

The data transmission method provided in this application may be applied to a computer device having a data transmission function, such as a server or a terminal. The terminal may be specifically a smart phone, a desktop computer, a notebook computer, a tablet computer, a smart speaker, a smart watch, or the like, but is not limited thereto. The server may be an independent physical server, or may be a server cluster including a plurality of physical servers or a distributed system. In addition, the server may also be a cloud server for providing basic cloud computing services such as a cloud service, a cloud database, cloud computing, a cloud function, cloud storage, a network service, cloud communication, a middleware service, a domain name service, a security service, a CDN, and a big data and artificial intelligence platform.

A cloud technology is a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources, such as video websites, image websites, and more portal websites. As the Internet industry is highly developed and applied, each article may have its own identifier in the future and needs to be transmitted to a background system for logical processing. Data at different levels is separately processed, and data in various industries requires strong system support, which can only be implemented through cloud computing.

For ease of understanding, in an example, a player (a user) plays a game for entertainment by using a target terminal device, which introduces an implementation scenario of cloud gaming. The cloud gaming, also referred to as gaming on demand, is an online gaming technology based on the cloud computing technology. The cloud gaming technology enables a thin client having a relatively limited capability of graphics processing and data computing to run high-quality games. In a cloud gaming scenario, a game is run in a cloud server rather than a player game terminal, and the cloud server renders a game scene into a video audio stream to be transmitted to the player game terminal through a network. The player game terminal does not need to have a strong capability of graphics computing and data processing, but only needs to have a basic streaming media playing capability and a capability of obtaining player input instructions and transmitting the instructions to the cloud server.

In the following introduction of the data transmission method, the data transmission method is introduced and described by using an example in which the method is performed by a server. Certainly, the method may also be performed by a terminal device.

Figure 3A:
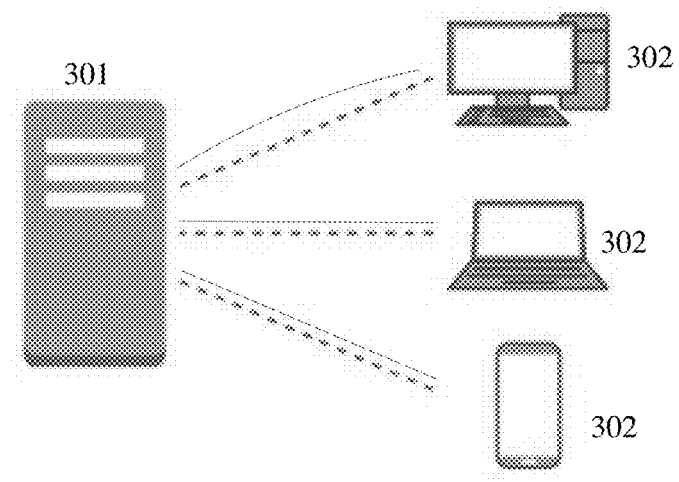
FIG. 3A is an architectural diagram of an application scenario of a data transmission method according to an embodiment of this application.

FIG. 3A is an architectural diagram of an application scenario of a data transmission method according to an embodiment of this application. The application scenario shown in FIG. 3A includes a server 301 and terminal devices 302. In actual application, the server 301 may be communicatively connected to one or more terminal devices 302.

For ease of description and understanding, a target terminal device is introduced in this embodiment of this application. The target terminal device 302 may be any one of the terminal devices 302 communicatively connected to the server 301. In the technical solutions of this application, the server 301 is an execution body of data transmission, and at least two transmission channels with different transmission protocols are established between the server 301 and the target terminal device 302. For ease of description and understanding, a first transmission channel and a second transmission channel are used as an example for description. For example, the first transmission channel may be a transmission channel under a TCP protocol, and the second transmission channel may be a transmission channel under a UDP protocol. In FIG. 3A, a dashed line and a solid line between the server 301 and the target terminal device 302 respectively represent the first transmission channel and the second transmission channel.

Figure 3B:
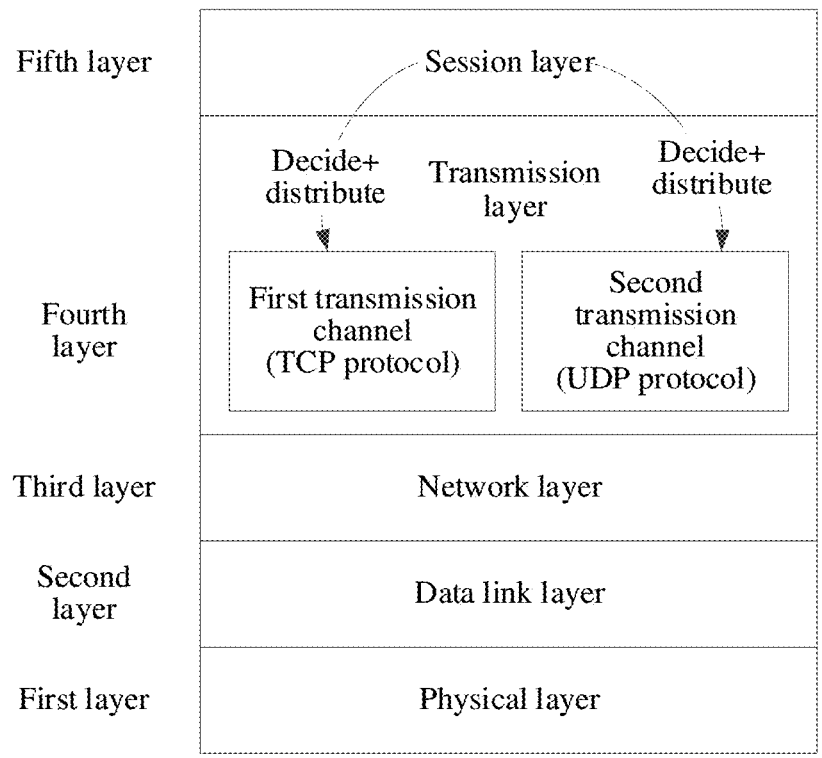
FIG. 3B is a schematic framework diagram of a communication model between a server and a target terminal device according to an embodiment of this application.

FIG. 3B is an architectural diagram of a communication model between a server and a target terminal device. As shown in FIG. 3B, the communication model includes a session layer, a transmission layer, a network layer, a data link layer, and a physical layer. In this model, the transmission layer includes a plurality of transmission channels using different transmission protocols, and FIG. 3B only simply shows the first transmission channel (the TCP protocol) and the second transmission channel (the UDP protocol). Specific transmission protocols corresponding to the transmission channels are not limited in the embodiments of this application.

In the communication model architecture shown in FIG. 3B, when the server transmits data to the target terminal device, the first layer, that is, the physical layer, is responsible for transmission of original bit streams on mechanical, electronic, and timing interface communication channels. The second layer, that is, the data link layer, is responsible for physical addressing, and transforms the original bit streams into logical transmission lines. The first layer and the second layer usually belong to network adaptors and network cables. The third layer, that is, the network layer, is responsible for controlling operations of a subnet, such as logical addressing, packet transmission, and route selection. The fourth layer, that is, the transmission layer, is used for transmitting to-be-transmitted content to a peer end (namely, the target terminal device), and receiving an acknowledgment from the peer end. The fifth layer, that is, the session layer, is used for establishing a session with the target terminal device and managing the session. The following mainly introduces an important role of the session layer from the communication model architecture in data transmission in this embodiment of this application.

Transmission of content by the server 301 to the target terminal device 302 is no longer only performed by the transmission layer independently, but also involves the session layer. The to-be-transmitted content may be multimedia data, such as video data and audio data. During actual implementation, the server 301 divides, through the session layer, to-be-transmitted content that needs to be provided for the target terminal device, and obtains a plurality of data units of the to-be-transmitted content through division. The data units obtained through division by the session layer may be uniformly managed by the session layer, including recognizing transmission states and importance identifiers of the data units and controlling distribution of the data units. That is, the session layer manages boundaries and states of the data units. In this embodiment of this application, when the session layer switches a responsible channel of the to-be-transmitted content, because the data units may be managed and distributed by the session layer to a new responsible channel, and transmission protocols of responsible channels before and after switching are different, the new responsible channel only needs to transmit, to the target terminal device 302, data units distributed by the session layer to the new responsible channel, and may skip re-transmitting the other data units that are not distributed. In this way, the session layer manages and controls transmission of the data units of the to-be-transmitted content, which increases the degree of freedom in data transmission, improves quality of the data transmission service, and also improves user experience.

Figure 3C:
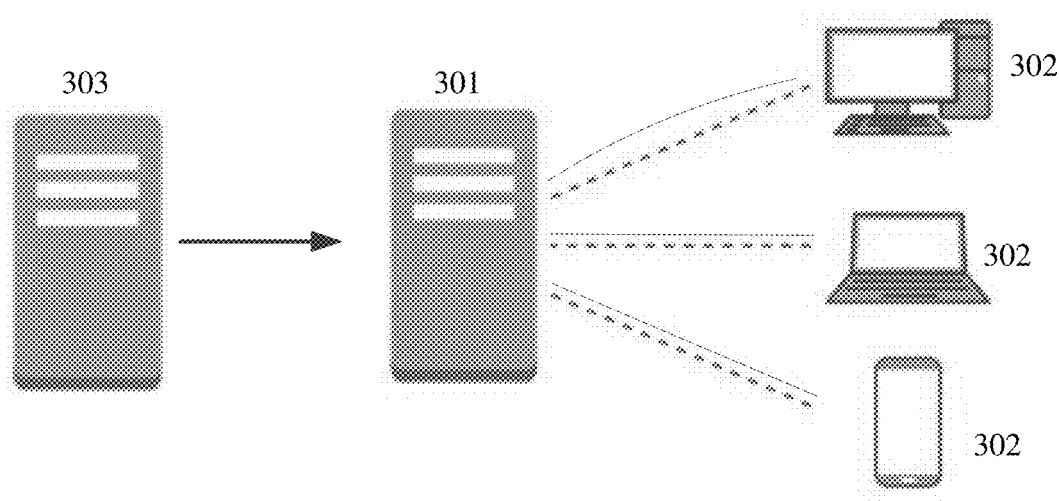
FIG. 3C is a schematic diagram of transmission of to-be-transmitted content by a video stream production device to a server according to an embodiment of this application.

In actual application, the to-be-transmitted content that the server 301 divides at the session layer may be provided by a video stream production device 303. FIG. 3C is a schematic diagram of transmission of to-be-transmitted content by a video stream production device 303 to a server 301.

Figure 4:
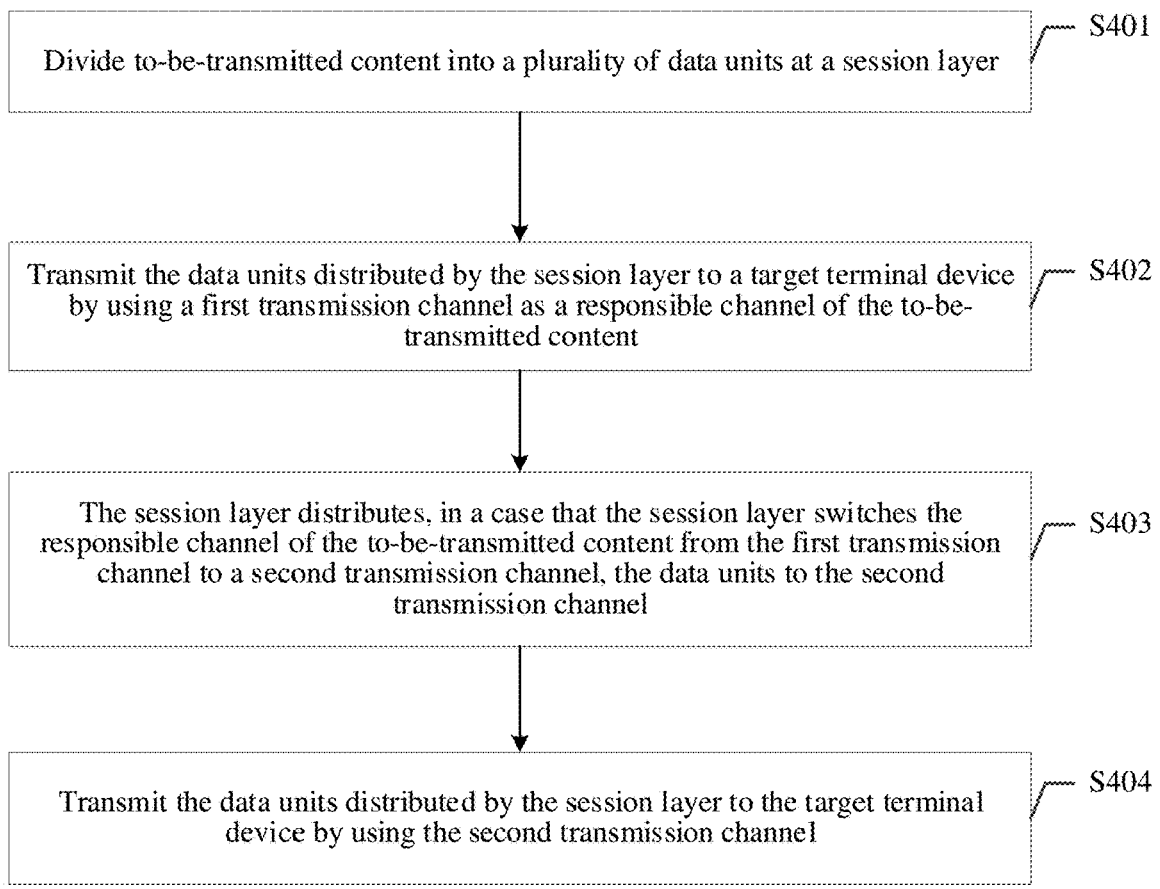
FIG. 4 is a flowchart of a data transmission method according to an embodiment of this application.

FIG. 4 is a flowchart of a data transmission method according to an embodiment of this application. This method is applied to the server 301 in the data transmission architecture shown in FIG. 3A, and this solution is implemented at the server 301. An implementation basis of this solution is that at least two transmission channels with different transmission protocols are established between the server and the target terminal device, and are used or reserved for data transmission.

The data transmission method shown in FIG. 4 includes the following steps.

S401. Divide to-be-transmitted content into a plurality of data units at a session layer.

The to-be-transmitted content described in this embodiment of this application is content that the server needs to transmit to the target terminal device. Using a cloud gaming scenario as an example, if the target terminal device runs a game application program, and a video stream of the game is integrated in a cloud video server, the cloud video server needs to transmit video data of the game that is used as the to-be-transmitted content to the target terminal device.

In this embodiment of this application, to facilitate accurate distribution and management of the video data by the server, before transmitting the to-be-transmitted content, the server divides the to-be-transmitted content (such as the video stream) into a plurality of data units at the session layer. By dividing the to-be-transmitted content into the data units at the session layer, data transmission can be free from constraints of an intrinsic data sequence number space of a transmission protocol of a transmission channel, to facilitate self-management and data distribution of the session layer.

An exemplary implementation of dividing the to-be-transmitted content is introduced below.

Using an example in which the to-be-transmitted content is a video, in an optional exemplary implementation, a video frame size of a video and a data packet size of the video are determined at the session layer; a smaller value between the video frame size and the data packet size is used as a division granularity; and the video is divided into the plurality of data units at the session layer according to the division granularity. If the video frame size is less than the data packet size, the video frame is used as the division granularity to divide the to-be-transmitted content into the plurality of data units; and if the data packet size is less than the video frame size, the data packet is used as the division granularity to divide the to-be-transmitted content into the plurality of data units.

In this exemplary implementation, the smaller value between the data packet size and the video frame size is used as the division granularity of the video, so that manageable data units have a smaller granularity, and the session layer can implement finer management and distribution of the video data.

These data units obtained through division by the session layer may be uniformly numbered and managed by the session layer, for example, numbered as 1, 2, 3, and the like. When dividing the to-be-transmitted content, the session layer may specifically number a forming sequence (for example, a forming sequence of video pictures) of the to-be-transmitted content based on data in the to-be-transmitted content. Management numbers of the data units at the session layer are different from sequence numbers allocated to data in a sequence number space under the transmission protocol of the first transmission channel, and are also different from sequence numbers allocated to data in a sequence number space under the transmission protocol of the second transmission channel. That is, the numbers of the data units are independent from a sequence number space of any transmission protocol, and are also independent from constraints on a transmission sequence of data with consecutive sequence numbers in any transmission protocol.

S402. Transmit the data units distributed by the session layer to the target terminal device by using a first transmission channel as a responsible channel of the to-be-transmitted content.

In this embodiment of this application, in the transmission channels established between the server and the target terminal device, the channel responsible for transmitting the to-be-transmitted content is referred to as the responsible channel. For ease of understanding, it is assumed that before the responsible channel is switched, the first transmission channel is used as the responsible channel, that is, an original channel for transmitting the data units, and after the responsible channel is switched, the second transmission channel is used as the responsible channel, that is, a current channel for transmitting the data units. Because the transmission protocol corresponding to the first transmission channel is not limited in this application, the specific original channel is not limited.

In this embodiment of this application, which transmission channel is used as the responsible channel of the to-be-transmitted content is determined by the session layer. For example, in actual application, the session layer may perform sampling (for example, performing sampling at a preset time interval or frequency) on the first transmission channel and the second transmission channel, to obtain network sampling results of the two transmission channels. Sampling content may include but is not limited to: a quantity of data units stacked in a channel, a packet loss rate of a channel, a round trip time (RTT), and the like. The network sampling result is a sampling result of the foregoing content.

In actual application, in an optional implementation, the server may make a decision between the two channels at the session layer based on the network sampling results. For example, the channel with a better network sampling result is used as the current responsible channel. Before S402, a decision that the first transmission channel is used as the responsible channel is made from the first transmission channel and the second transmission channel.

S403. The session layer distributes, when the session layer switches the responsible channel of the to-be-transmitted content from the first transmission channel to a second transmission channel, the data units to the second transmission channel.

Network sampling on the transmission channels is performed continuously or periodically. During transmission of the data units, the network sampling result of the first transmission channel is not fixed, but may change. In this case, the session layer may switch, based on the network sampling result, the responsible channel from the first transmission channel to another transmission channel with a different transmission protocol, such as the second transmission channel. After the responsible channel is switched, the session layer may no longer distribute the data units to the original responsible channel (namely, the first transmission channel), but distributes the data units to the new responsible channel (namely, the second transmission channel).

The data units distributed to the second transmission channel may include various types of data units, for example, a data unit that has not been transmitted by the first transmission channel, and a data unit unsuccessfully transmitted by the first transmission channel.

S404. Transmit the data units distributed by the session layer to the target terminal device through the second transmission channel.

In this step, the second transmission channel only needs to be responsible for transmitting the data units distributed by the session layer.

Figure 5:
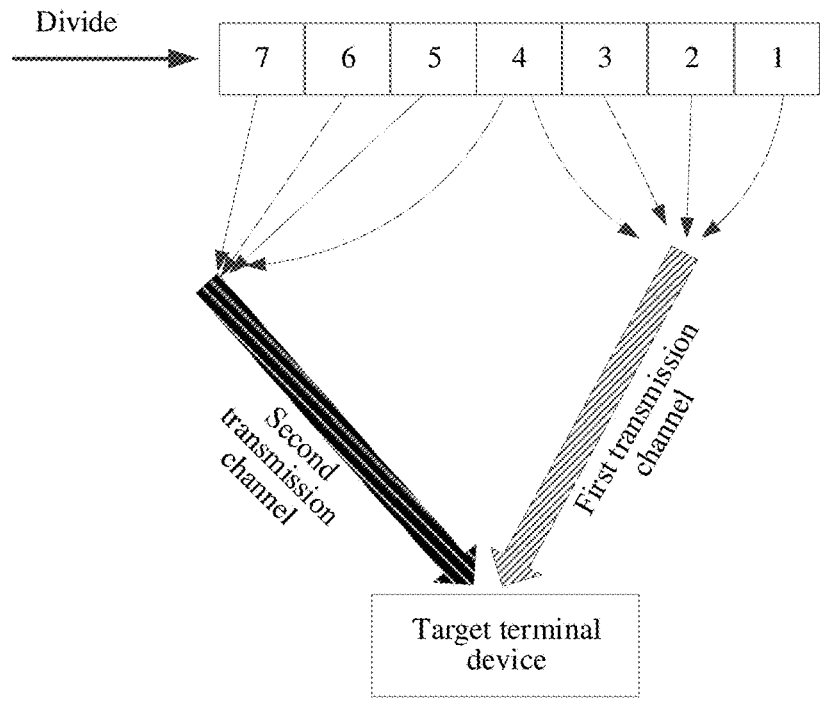
FIG. 5 is a schematic diagram of distribution of data units by a server at a session layer to transmission channels according to an embodiment of this application.

FIG. 5 is a schematic diagram of distribution of data units by a server at a session layer to transmission channels according to an embodiment of this application. As shown in FIG. 5, data units 1 to 4 are distributed to the first transmission channel, the data unit 4 further needs to be distributed to the second transmission channel, and data units 5 to 7 that have not been distributed also need to be distributed to the second transmission channel. A reason for the distribution policy change is that the responsible channel of the to-be-transmitted content is switched from the first transmission channel to the second transmission channel. The second transmission channel only needs to be responsible for transmitting the data units 4, 5, 6, and 7 to the target terminal device, and does not need to be responsible for transmitting the data units 1 to 3 that are not distributed to the second transmission channel. The data unit 4 may be a to-be-retransmitted data unit that is unsuccessfully transmitted by the first transmission channel.

As can be learned from this, a first transmission channel and a second transmission channel with different transmission protocols are established between a server and a target terminal device. Before the server transmits to-be-transmitted content to the target terminal device, the to-be-transmitted content is divided into a plurality of data units at a session layer, and the session layer makes a switching decision on a responsible channel for transmitting the to-be-transmitted content. When the session layer switches the responsible channel from the first transmission channel to the second transmission channel, the session layer distributes the data units to the second transmission channel, and the second transmission channel specifically transmits the data units distributed by the session layer to the target terminal device. Because the transmission protocols of the two transmission channels are different, and the session layer is responsible for dividing and distributing the data units, data transmission can be free from constraints of an intrinsic data sequence number space of a transmission protocol, to facilitate self-management and data distribution of the session layer. Therefore, the data transmission is free from constraints of the same sequence space of a transmission protocol, and after channel switching, only distributed data units need to be transmitted, so that the degree of freedom in transmission is increased, quality of the data transmission service is also effectively improved, and a user corresponding to the target terminal device can more smoothly experience content provided by the server.

In the related art, data transmission is usually independently performed by a transmission layer, which leads to a case that, in some cases, experience effects of a user after data transmission may not match actual requirements. For example, an actual bit rate is excessively low and a latency is excessively large. A main reason for this is that the transmission layer cannot sense these requirements. To resolve the foregoing problem, this application further provides another data transmission method. When a session layer determines a responsible channel, reference is made to a performance requirement of to-be-transmitted content. In this way, a transmission effect of a determined channel better matches the requirements, thereby improving quality of the data transmission service and user experience.

Figure 6:
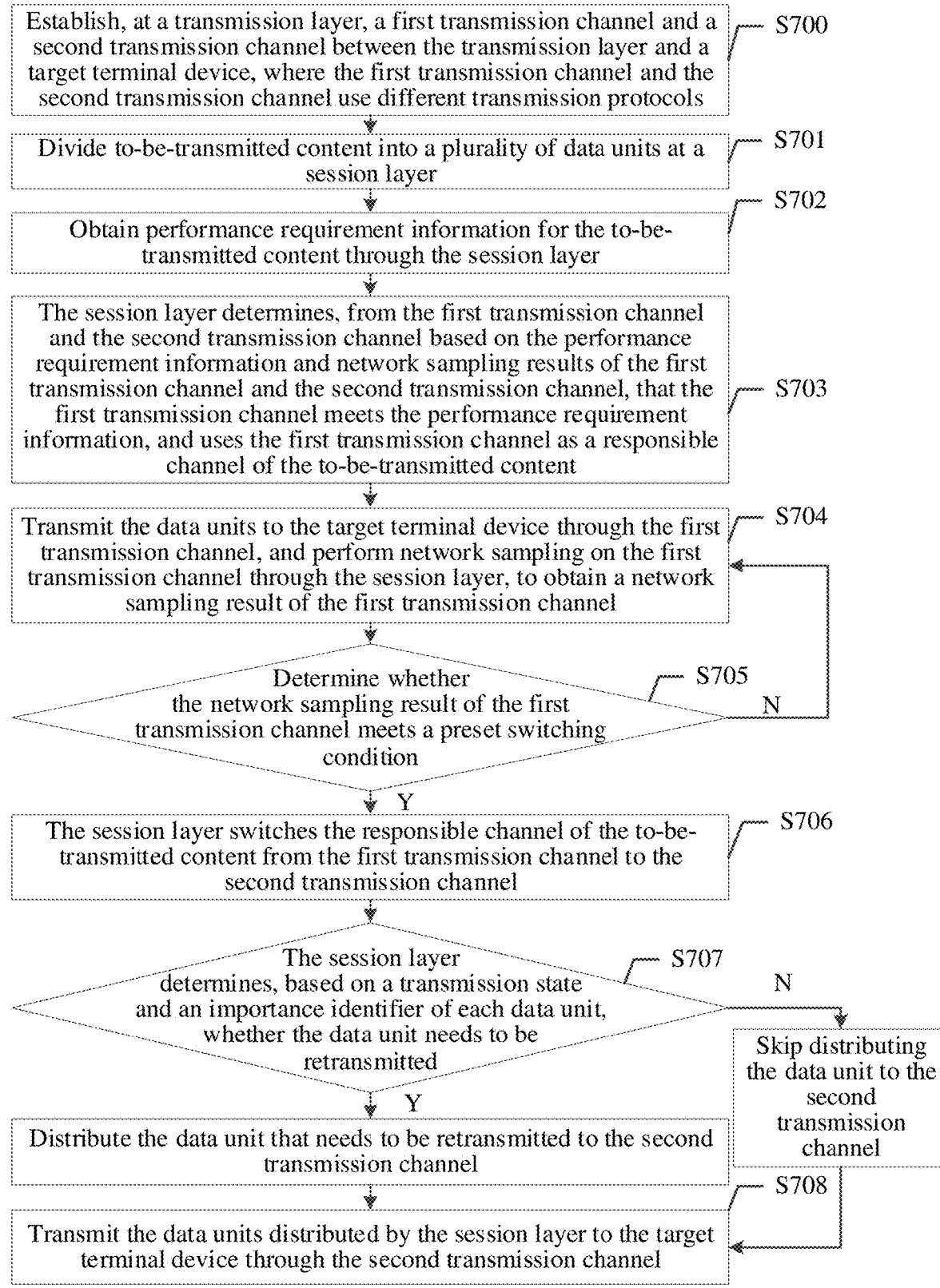
FIG. 6 is a flowchart of another data transmission method according to an embodiment of this application.

FIG. 6 is a flowchart of another data transmission method according to an embodiment of this application. The data transmission method shown in FIG. 6 includes the following steps.

S700. Establish, at a transmission layer, a first transmission channel and a second transmission channel between the transmission layer and a target terminal device, where the first transmission channel and the second transmission channel use different transmission protocols.

For a schematic diagram of establishing communication between a plurality of channels with different transmission protocols and the target terminal device, refer to FIG. 3A.

S701. Divide to-be-transmitted content into a plurality of data units at a session layer.

An implementation of this step is substantially the same as that of S401 in the foregoing embodiment, and reference may be made to the foregoing embodiment. Details are not described herein.

S702. Obtain performance requirement information for the to-be-transmitted content through the session layer.

The performance requirement information for the to-be-transmitted content may include information in various aspects, such as a video bit rate, a transmission rate, a latency, resolution, and the like. Two implementations of obtaining the performance requirement information for the to-be-transmitted content are exemplarily introduced below.

In a possible implementation, the session layer may receive the performance requirement information for the to-be-transmitted content from the target terminal device. The performance requirement information may be setting results concerning the to-be-transmitted content by a user corresponding to the target terminal device. For example, if the to-be-transmitted content is a cloud game, a player sets the foregoing requirements, and these setting results may be uploaded to a server after setting is completed.

In another possible implementation, the session layer determines the performance requirement information for the to-be-transmitted content based on a type of the to-be-transmitted content. For example, different types of videos correspond to different performance requirement information. For example, when a player experiences a cloud game, a battle mode in the game may be involved. Therefore, the cloud game needs to ensure that the player experiences a high bit rate and an ultra-low latency, thereby ensuring smooth operations. In a video call service, requirements on the foregoing aspects are lower. Therefore, a mapping relationship between the type of the to-be-transmitted content and the performance requirement information may be pre-established, so that the performance requirement information for the to-be-transmitted content may be directly determined based on the type of the to-be-transmitted content according to the mapping relationship.

S703. The session layer determines, according to network sampling results of the first transmission channel and the second transmission channel, the transmission channel whose network sampling result meets the performance requirement information from the first transmission channel and the second transmission channel as the responsible channel.

In this step, the first transmission channel may be exemplarily used as the determined responsible channel.

In this embodiment of this application, network statuses of the first transmission channel and the second transmission channel are continuously monitored. By comparing the performance requirement information obtained in S702 with the network sampling results of the first transmission channel and the second transmission channel, whether the first transmission channel and the second transmission channel meet the performance requirement information is determined. For example, when the network sampling result of the second transmission channel indicates that the second transmission channel cannot meet a performance requirement of the to-be-transmitted content, and the network sampling result of the first transmission channel indicates that the first transmission channel can meet the performance requirement of the to-be-transmitted content, the first transmission channel may be selected as the responsible channel of the to-be-transmitted content.

By determining the network sampling results of the first transmission channel and the second transmission channel, performance of the transmission channels may be determined based on the network sampling results, so as to accurately determine the transmission channel that meets the performance requirement information to transmit the data units, thereby increasing a success rate of data transmission.

In addition, if the network sampling results of the two transmission channels both can meet the performance requirement of the to-be-transmitted content, the transmission channel that better matches (that is, closer to) the performance requirement information may be determined from the first transmission channel and the second transmission channel. For example, if the network sampling result of the first transmission channel better matches the performance requirement information, the first transmission channel is used as the responsible channel of the to-be-transmitted content. Selecting the transmission channel that matches better can further ensure transmission performance.

S704. Transmit the data units to the target terminal device through the first transmission channel, and perform network sampling on the first transmission channel through the session layer, to obtain a network sampling result of the first transmission channel.

Specifically, the session layer may perform sampling on a quantity of data units stacked in the first transmission channel, a packet loss rate, and an RTT.

S705. Determine whether the network sampling result of the first transmission channel meets a preset switching condition. If yes, perform S706; and if not, perform S704.

With reference to the introduction of S704, sampling content may include three aspects: a quantity of stacked data units, a packet loss rate, and an RTT. The preset switching condition may be set according to actual decision requirements. The preset switching condition includes any one of the following conditions or a combination of the following plurality of conditions:

a first condition: the quantity of the data units stacked in the first transmission channel exceeds a preset quantity;

a second condition: the packet loss rate of the first transmission channel reaches a preset rate; and a third condition: the RTT exceeds a preset duration.

When the preset switching condition includes a combination of multiple of the three conditions, the responsible channel needs to be switched if any condition in the preset switching condition is met.

Any one of the first condition to the third condition being met indicates continuing to transmit the data units through the current channel, and expected quality of the data transmission service cannot be realized, which results in a bad user experience. The first condition being met indicates that serious congestion occurs in the first transmission channel, and the data units can hardly be transmitted. The second condition being met indicates that the packet loss rate is excessive, and the data units received by a peer end are seriously missing. The third condition being met indicates that the latency is excessive, and a serious breakpoint is experienced at the peer end.

If the preset switching condition is not met, the original channel is continuously used to transmit the data units, and is under continuous monitoring.

Transmission performance of the transmission channels is determined through sampling from a plurality of dimensions, which can effectively improve accuracy in determining the responsible channel.

S706. In event that the network sampling result meets the preset switching condition, the session layer switches the responsible channel of the to-be-transmitted content from the first transmission channel to the second transmission channel, and perform S707.

In this embodiment of this application, in order to improve quality of the data transmission service (for example, smoothness and a speed of video data transmission), for data units that are unsuccessfully transmitted by the first transmission channel, it is not required to distribute all the data units to the second transmission channel, to drive the second transmission channel to transmit the data units to the target terminal device. For ease of understanding, in some implementations of selecting, by the session layer based on a transmission state and an importance identifier of each data unit, the data units to be distributed to the second transmission channel is introduced below.

S707. The session layer determines, based on a transmission state and an importance identifier of each data unit, whether the data unit needs to be retransmitted; and if yes, distribute the data unit to the second transmission channel and perform S708; and if not, skip distributing the data unit to the second transmission channel, and perform S708.

Figure 7A:
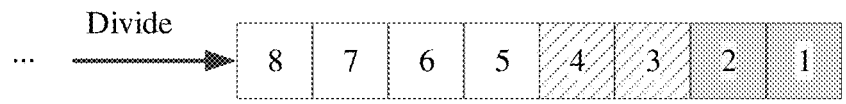
FIG. 7A is a schematic diagram of a plurality of data units in different transmission states according to an embodiment of this application.

The session layer may recognize the transmission state and the importance identifier of the data unit. The transmission state of the data unit may include: not transmitted, successfully transmitted, and unsuccessfully transmitted. Not transmitted refers to that the data unit has not been transmitted to the target terminal device; successfully transmitted refers to that the data unit is transmitted and an acknowledgment of the peer end (namely, the target terminal device) is received; and unsuccessfully transmitted refers to that the data unit is transmitted but no acknowledgment of the peer end is received. FIG. 7A shows a plurality of data units in different transmission states. Data units 1 and 2 are successfully transmitted data units, data units 3 and 4 are unsuccessfully transmitted data units, and data units 5 to 8 are data units that have not been transmitted.

The importance identifier indicates importance of a data unit to the to-be-transmitted content, and may be allocated by the session layer and accessed when required. A specific allocation manner may be based on an attribute of data. For example, when a video frame is used as a division granularity, an importance identifier "first identifier" is added if the data unit is a key frame, and an importance identifier "second identifier" is added if the data unit is not a key frame. Importance of a data unit whose importance identifier is the "first identifier" is higher than that of a data unit whose importance identifier is the "second identifier". In an example, the first identifier is 1, and the second identifier is 0.

The session layer recognizes, based on the transmission state of each data unit, a target data unit that is unsuccessfully transmitted by the first transmission channel. The session layer recognizes an importance identifier of the target data unit. If the importance identifier is the first identifier, the session layer distributes the target data unit to the second transmission channel; and if the importance identifier is the second identifier, the target data unit is not distributed to the second transmission channel. This indicates that the second transmission channel does not need to retransmit all the unsuccessfully transmitted data units, which are selectively distributed to the second transmission channel according to importance.

If the transmission state of the data unit indicates that transmission is unsuccessful, and the importance identifier is the second identifier, it is determined that the data unit does not need to be retransmitted; and if the transmission state of the data unit indicates that transmission is unsuccessful, and the importance identifier is the first identifier, it is determined that the data unit needs to be retransmitted.

By using the importance identifier, the target data unit may be selectively retransmitted, and transmission resources are properly used on the premise of ensuring transmission quality, thereby increasing transmission efficiency.

Figure 7B:
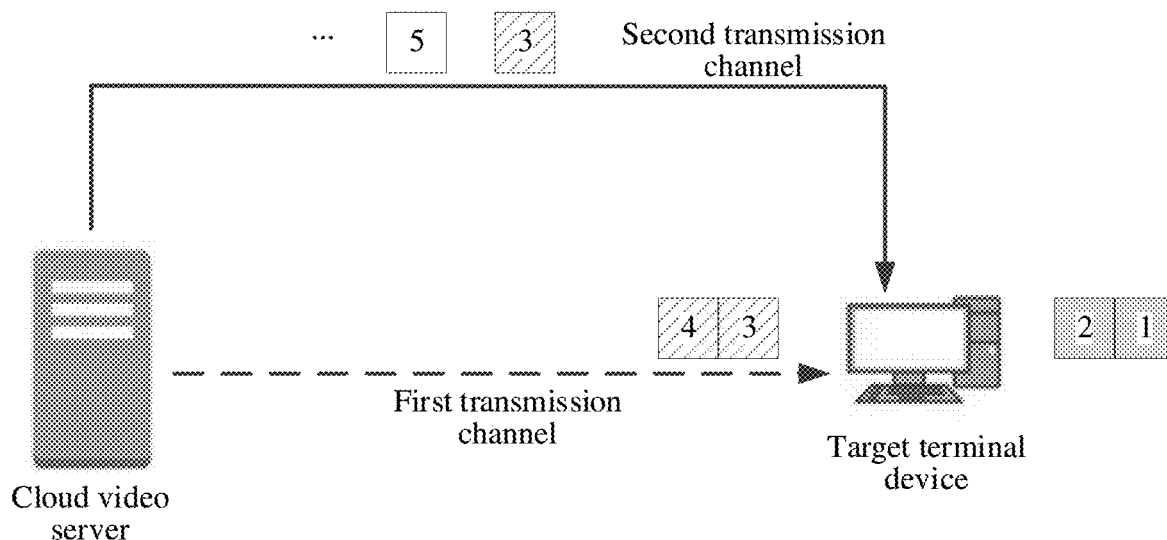
FIG. 7B is a schematic diagram of selective distribution of data units to a second transmission channel according to this application.

FIG. 7B is a schematic diagram of selective distribution of data units to a second transmission channel according to this application. In FIG. 7B, the responsible channel is switched by the session layer from the first transmission channel to the second transmission channel. Data units 1 and 2 have already been successfully transmitted by the first transmission channel from the server to the target terminal device. Data unit 3 and data unit 4 are data units unsuccessfully transmitted by the first transmission channel. By recognizing importance identifiers, it is determined that the data unit 3 needs to be retransmitted, and the data unit 3 is therefore redistributed by the session layer to the second transmission channel. Because the importance identifier of the stacked data unit 4 indicates that the data unit 4 does not need to be retransmitted, and re-transmission may be skipped, it is determined that the data unit 4 is not distributed to the second transmission channel, so as to ensure real-time performance of data transmission. A data unit 5 after the data unit 4 is a data unit of a new frame of picture of the to-be-transmitted content, has not been transmitted by the first transmission channel, and therefore is directly distributed by the session layer to the second transmission channel. In other words, after finishing retransmitting the data unit 3, the second transmission channel may directly transmit the data unit 5 to the target terminal device, and does not need to be responsible for transmitting an undistributed data unit.

Referring to FIG. 7B, it is easy to find that in this embodiment of this application, when the responsible channel is switched, the session layer selectively distributes the data units to a new channel based on the transmission state and the importance identifier, to transmit important data units in the to-be-transmitted content to the target terminal device through the new channel as soon as possible. In this way, reliability of the data transmission service is ensured, and the multi-channel design can also significantly improve reliability of transmission work.

S708. Transmit the data units distributed by the session layer to the target terminal device through the second transmission channel.

In this embodiment of this application, the performance requirement information for the to-be-transmitted content is obtained, and with reference to the performance requirement information, a channel with a higher matching degree is selected as the responsible channel of the to-be-transmitted content. In this solution, the session layer senses actual requirements in the application scenario of the to-be-transmitted content, thereby resolving the problem that cannot be resolved by relying on the transmission layer alone, improving transmission smoothness and reliability of the channel used in transmission, better matching the actual requirements, and improving quality of the data transmission service.

In actual application, in some possible implementation scenarios, when one transmission channel cannot meet requirements on transmission performance, the session layer may also use a plurality of transmission channels with different transmission protocols as responsible channels of the to-be-transmitted content. In addition, if a user corresponding to the target terminal device has a high-priority user account, it is possible to use a plurality of transmission channels as the responsible channels. The server concurrently distributes different data units to different transmission channels.

Figure 8:
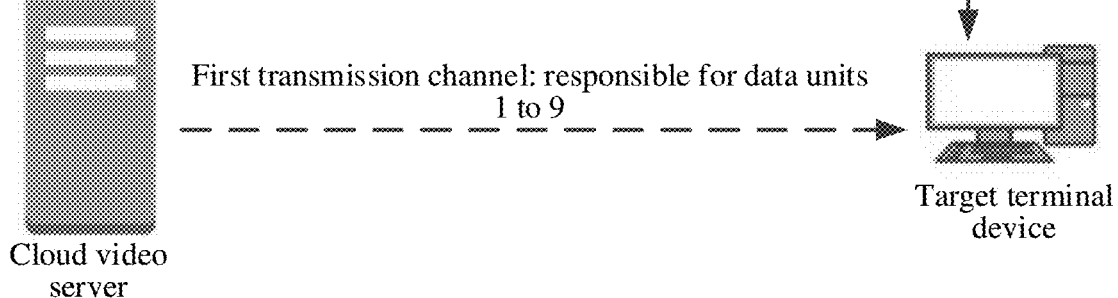
FIG. 8 is a schematic diagram of distribution of data units in a plurality of channels according to an embodiment of this application.

FIG. 8 is a schematic diagram of distribution of data units in a plurality of channels according to an embodiment of this application. For example, the session layer uses the first transmission channel as a responsible channel of data units 1 to 9, and uses the second transmission channel as a responsible channel of data units 10 to 15. When congestion occurs in the first transmission channel, the server distributes the to-be-retransmitted data units 7 to 9 to the second transmission channel through management and decision of the session layer, so that the second transmission channel retransmits the data units 7 to 9 to the target terminal device.

Figure 9:
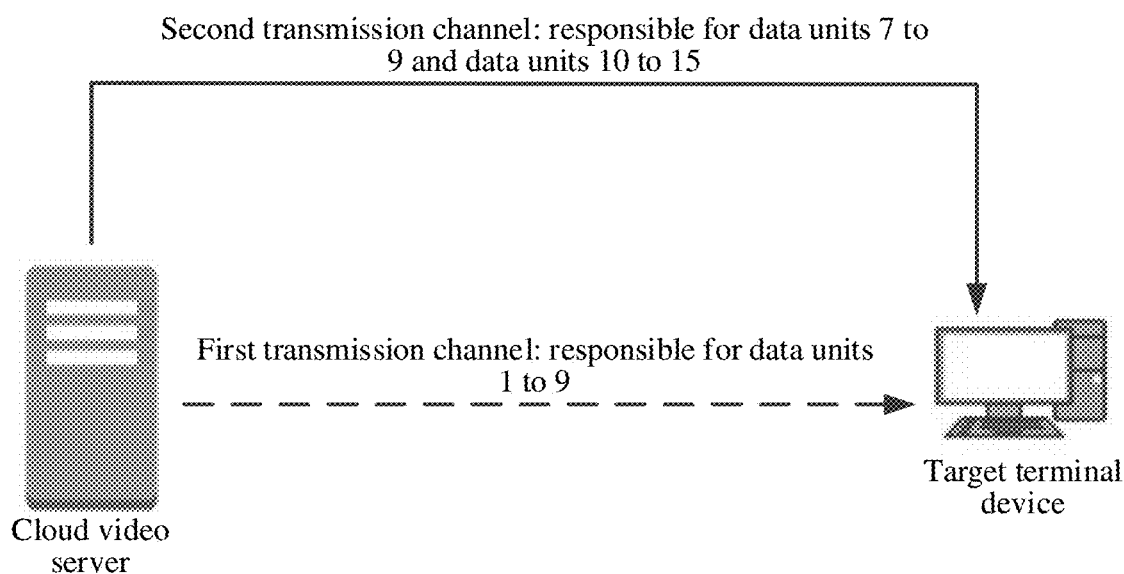
FIG. 9 is a schematic diagram of distribution of to-be-retransmitted data units stacked in a first transmission channel to a second transmission channel according to an embodiment of this application.

FIG. 9 is a schematic diagram of distribution of to-be-retransmitted data units stacked in a first transmission channel to a second transmission channel according to an embodiment of this application.

During transmission of video data to the target terminal device by the server in the foregoing embodiment, the transmission channels with protocols are under continuous monitoring. Therefore, when the network sampling result of the second transmission channel used as the responsible channel meets the preset switching condition, and the first transmission channel returns to normal, the session layer switches the responsible channel again, that is, the responsible channel is switched back from the second transmission channel to the first transmission channel. In this way, transmission quality of data is ensured. In addition, for unsuccessfully transmitted data units, the session layer still recognizes the importance identifiers of the data units, to determine a distribution policy.

Based on the data transmission methods provided in the foregoing embodiments, correspondingly, this application further provides a data transmission apparatus. A specific implementation of the apparatus is described below with reference to the embodiments and the accompanying drawing.

Figure 10:
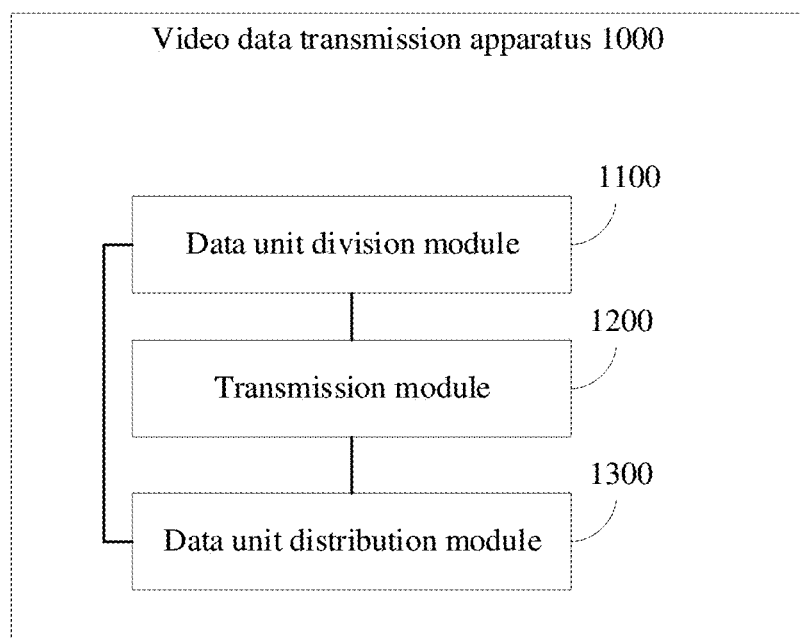
FIG. 10 is a schematic structural diagram of a data transmission apparatus according to an embodiment of this application.

FIG. 10 is a schematic structural diagram of a data transmission apparatus according to an embodiment of this application. The data transmission apparatus 1000 shown in FIG. 10 includes:

a data unit division module 1100, configured to divide to-be-transmitted content into a plurality of data units at a session layer, to-be-transmitted content being to be transmitted to a target terminal device;

a transmission module 1200, configured to transmit the data units distributed by the session layer to the target terminal device by using a first transmission channel as a responsible channel of the to-be-transmitted content; and a data unit distribution module 1300, configured to distribute, by the session layer in a case that the session layer switches the responsible channel of the to-be-transmitted content from the first transmission channel to a second transmission channel, the data units to the second transmission channel, the first transmission channel and the second transmission channel using different transmission protocols at a transmission layer; and the transmission module 1200 being further configured to transmit the data units distributed by the session layer to the target terminal device through the second transmission channel.

In some embodiments, the transmission module 1200 includes:

an information obtaining unit, configured obtain performance requirement information for the to-be-transmitted content through the session layer;

a responsible channel determining unit, configured to determine, by the session layer according to network sampling results of the first transmission channel and the second transmission channel, the transmission channel whose network sampling result meets the performance requirement information from the first transmission channel and the second transmission channel as the responsible channel of the to-be-transmitted content; and a first transmission unit, configured to transmit the data units of the to-be-transmitted content to the target terminal device through the first transmission channel.

In some embodiments, the information obtaining unit is configured receive the performance requirement information for the to-be-transmitted content from the target terminal device through the session layer; or determine, by the session layer, the performance requirement information for the to-be-transmitted content based on a type of the to-be-transmitted content.

In some embodiments, the responsible channel determining unit is configured to use the first transmission channel as the responsible channel of the to-be-transmitted content in response to a determination through the session layer that the network sampling results of the first transmission channel and the second transmission channel both meet the performance requirement information, and that the network sampling result of the first transmission channel better matches the performance requirement information.

In some embodiments, the to-be-transmitted content includes a video, and the data unit division module 1100 includes:

a data size determining unit, configured to determine a video frame size and a data packet size of the video at the session layer;

a division granularity determining unit, configured to use a smaller value between the video frame size and the data packet size as a division granularity; and a dividing unit, configured to divide the video into the plurality of data units at the session layer according to the division granularity.

In some embodiments, the data unit distribution module 1300 is configured to select, by the session layer based on a transmission state and an importance identifier of each data unit, the data units to be distributed to the second transmission channel.

In some embodiments, the data unit distribution module 1300 includes:

a transmission state recognition unit, configured to recognize, by the session layer, a target data unit based on the transmission states of the data units, where the target data unit is a data unit unsuccessfully transmitted by the first transmission channel;

an importance recognition unit, configured to recognize, by the session layer, the importance identifier of the target data unit; and a distribution unit, configured to distribute, by the session layer, the target data unit to the second transmission channel where the importance identifier of the target data unit is a first identifier; and skip distributing the target data unit to the second transmission channel where the importance identifier of the target data unit is a second identifier.

In some embodiments, the data transmission apparatus may further include:

a channel switching module, configured to switch the responsible channel from the first transmission channel to the second transmission channel with a different transmission protocol.

The channel switching module includes:

a sampling unit, configured to perform, network sampling on the first transmission channel through the session layer, to obtain a network sampling result of the first transmission channel; and a channel switching unit, configured to switch, by the session layer, the responsible channel of the to-be-transmitted content from the first transmission channel to the second transmission channel when the network sampling result meets a preset switching condition.

In some embodiments, the sampling unit is specifically configured to perform sampling on a quantity of data units stacked in the first transmission channel, a packet loss rate, and an RTT through session layer, to obtain the network sampling result of first transmission channel, where the preset switching condition includes any one of the following conditions or a combination of the following plurality of conditions:

a first condition: the quantity of the data units stacked in the first transmission channel exceeds a preset quantity;

a second condition: the packet loss rate of the first transmission channel reaches a preset rate; and a third condition: the RTT exceeds a preset duration.

In some embodiments, the data transmission apparatus further includes:

a channel establishing module, configured to establish the first transmission channel and the second transmission channel between the transmission layer and the target terminal device.

The data transmission apparatus provided in this embodiment of this application may be applied to a terminal device or a server, and the to-be-transmitted content is multimedia data. Optionally, the server is a cloud video server, and the multimedia data is a cloud video.

The server involved in the data transmission method or apparatus disclosed in this application may form a blockchain with other servers, and the server is a node on the blockchain.

As can be learned from this, a first transmission channel and a second transmission channel that are connected to a target terminal device are established at a transmission layer, and the two channels use different transmission protocols. Before to-be-transmitted content is transmitted to the target terminal device, the to-be-transmitted content is divided into a plurality of data units at a session layer, and the session layer makes a switching decision on a responsible channel for transmitting the to-be-transmitted content. When the session layer switches the responsible channel from the first transmission channel to the second transmission channel, the session layer distributes the data units to the second transmission channel, and the second transmission channel specifically transmits the data units distributed by the session layer to the target terminal device. Because the transmission protocols of the two transmission channels are different, and the session layer is responsible for dividing and distributing the data units, data transmission can be free from constraints of an intrinsic data sequence number space of a transmission protocol, to facilitate self-management and data distribution of the session layer. Therefore, the data transmission is free from constraints of the same sequence space of a transmission protocol, so that the degree of freedom in transmission is increased, quality of the data transmission service is also effectively improved, and a user corresponding to the target terminal device can experience transmitted content more smoothly. In addition, the multi-channel design can also increase reliability of data transmission.

Figure 11:
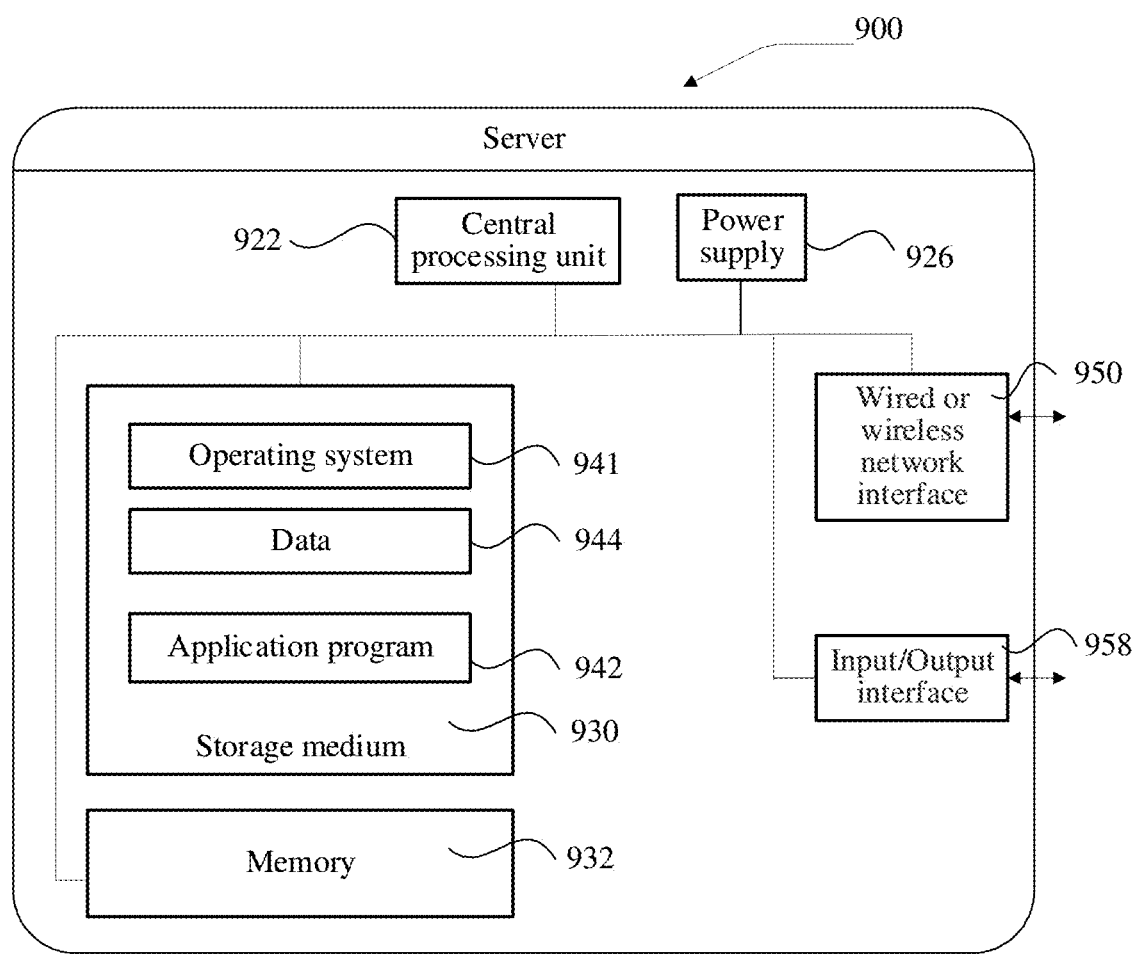
FIG. 11 is a schematic structural diagram of a server configured to transmit data according to an embodiment of this application.

FIG. 11 is a schematic structural diagram of a server according to an embodiment of this application. The server 900 is configured to transmit data. The server 900 may vary greatly due to different configurations or performance, and may include one or more central processing units (CPU) 922 (for example, one or more processors) and a memory 932, and one or more storage media 930 (for example, one or more mass storage devices) that store application programs 942 or data 944. The memory 932 and the storage medium 930 may be transient or persistent storages. The program stored in the storage medium 930 may include one or more modules (not marked in the figure), and each module may include a series of instruction operations to the server. Still further, the CPU 922 may be configured to communicate with the storage medium 930, and perform, on the server 900, the series of instruction operations in the storage medium 930.

The server 900 may further include one or more power supplies 926, one or more wired or wireless network interfaces 950, one or more input/output interfaces 958, and/or one or more operating systems 941, for example, Windows Server™, Mac OS X™, Unix™, Linux™, or FreeBSD™.

The steps performed by the server in the foregoing embodiment may be based on the server structure shown in FIG. 11.

The CPU 922 is configured to perform the following steps:

dividing to-be-transmitted content into a plurality of data units at a session layer, the to-be-transmitted content being to be transmitted to a target terminal device;

transmitting the data units distributed by the session layer to the target terminal device by using a first transmission channel as a responsible channel of the to-be-transmitted content;

distributing, by the session layer in a case that the session layer switches the responsible channel of the to-be-transmitted content from the first transmission channel to a second transmission channel with a different transmission protocol, the data units to the second transmission channel, the first transmission channel and the second transmission channel using different transmission protocols at a transmission layer; and transmitting the data units distributed by the session layer to the target terminal device through the second transmission channel.

Figure 12:
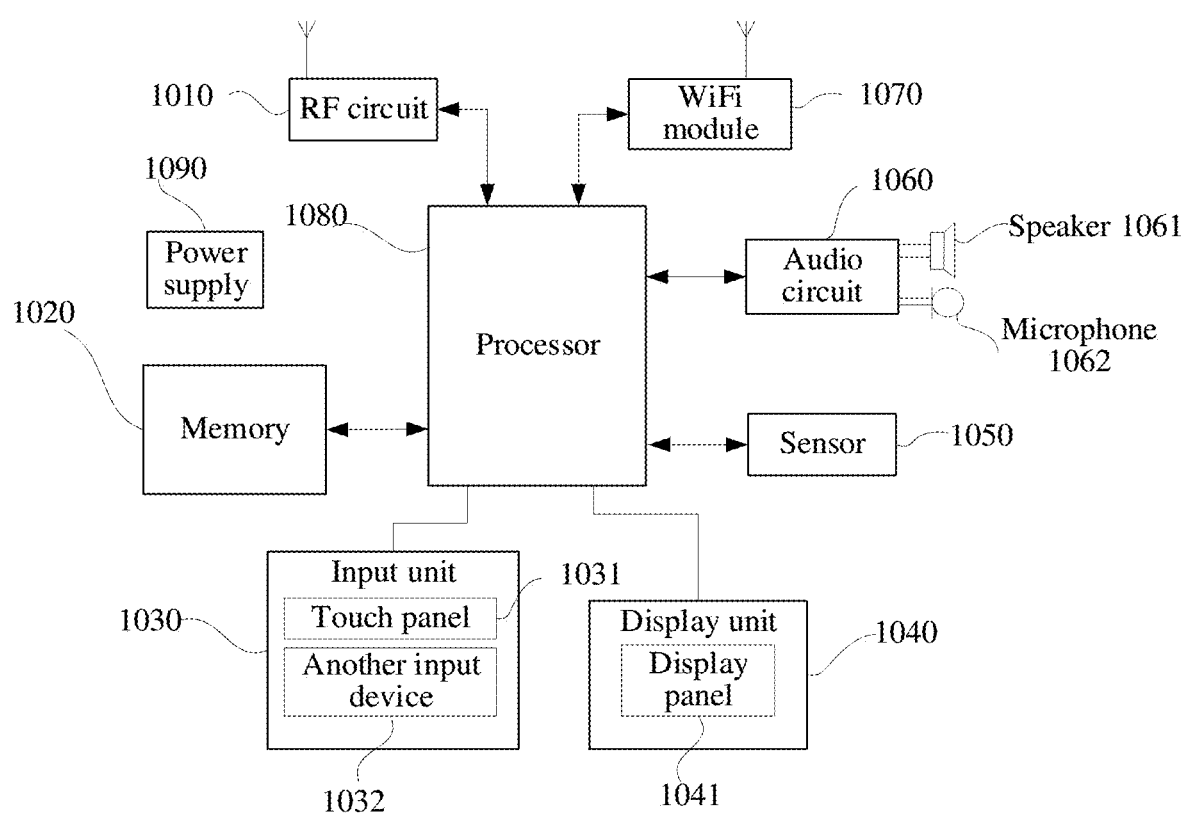
FIG. 12 is a schematic structural diagram of a terminal device configured to transmit data according to an embodiment of this application.

An embodiment of this application further provides another terminal device configured to transmit data. As shown in FIG. 12, for convenience of description, only parts related to the embodiment of this application are shown. For specific technical details that are not disclosed, refer to the method part of the embodiments of this application. The terminal device may be any terminal device, including a mobile phone, a tablet computer, a personal digital assistant (PDA), a point of sales (POS), an in-vehicle computer, or the like. An example in which the terminal device is a mobile phone is used.

FIG. 12 is a block diagram of a part of a structure of the mobile phone related to the terminal device according to this embodiment of this application. Referring to FIG. 12, the mobile phone includes components such as a radio frequency (RF) circuit 1010, a memory 1020, an input unit 1030, a display unit 1040, a sensor 1050, an audio circuit 1060, a wireless fidelity (WiFi) module 1070, a processor 1080, and a power supply 1090. A person skilled in the art may understand that the structure of the mobile phone shown in FIG. 12 does not constitute a limitation on the mobile phone, and the mobile phone may include more components or fewer components than those shown in the figure, or some components may be combined, or a different component deployment may be used.

The following makes a detailed description of the components of the mobile phone with reference to FIG. 12:

The RF circuit 1010 may be configured to receive and send a signal in an information receiving and sending process or a call process, and in particular, after downlink information of a base station is received, send the downlink information to the processor 1080 for processing. In addition, the RF circuit transmits uplink data to the base station.

The memory 1020 may be configured to store a software program and module. The processor 1080 runs the software program and module stored in the memory 1020, to implement various functional applications and data processing of the mobile phone.

The input unit 1030 may be configured to receive inputted digit or character information, and generate a keyboard signal input related to the user setting and function control of the mobile phone. Specifically, the input unit 1030 may include a touch panel 1031 and another input device 1032.

The display unit 1040 may be configured to display information inputted by the user or information provided for the user, and various menus of the mobile phone. The display unit 1040 may include a display panel 1041.

The mobile phone may further include at least one sensor 1050 such as an optical sensor, a motion sensor, and other sensors. Specifically, the optical sensor may include an ambient light sensor and a proximity sensor. The ambient light sensor may adjust luminance of the display panel 1041 according to brightness of the ambient light. The proximity sensor may switch off the display panel 1041 and/or backlight when the mobile phone is moved to the ear.

The audio circuit 1060, a speaker 1061, and a microphone 1062 may provide audio interfaces between the user and the mobile phone.

WiFi is a short distance wireless transmission technology. The mobile phone may help, by using the WiFi module 1070, a user to send and receive an email, browse a web page, access stream media, and the like. This provides wireless broadband Internet access for the user.

The processor 1080 is a control center of the mobile phone, and is connected to various parts of the entire mobile phone by using various interfaces and lines. By running or executing the software program and/or the module stored in the memory 1020, and invoking data stored in the memory 1020, the processor executes various functions of the mobile phone and performs data processing.

The mobile phone further includes the power supply 1090 (such as a battery) for supplying power to the components.

In this embodiment of this application, the processor 1080 included in the terminal device further has the following functions:

dividing to-be-transmitted content into a plurality of data units at a session layer, the to-be-transmitted content being to be transmitted to a target terminal device;

transmitting the data units distributed by the session layer to the target terminal device by using a first transmission channel as a responsible channel of the to-be-transmitted content;

distributing, by the session layer in a case that the session layer switches the responsible channel of the to-be-transmitted content from the first transmission channel to a second transmission channel with a different transmission protocol, the data units to the second transmission channel, the first transmission channel and the second transmission channel using different transmission protocols at a transmission layer; and transmitting the data units distributed by the session layer to the target terminal device through the second transmission channel.

An embodiment of this application further provides a computer-readable storage medium configured to store program code, the program code being configured to perform any implementation in the data transmission methods according to the foregoing embodiments.

An embodiment of this application further provides a computer program product including instructions, the computer program product, when run on a computer, causing the computer to perform any implementation in the data transmission methods according to the foregoing embodiments.

A person skilled in the art may clearly understand that, for the purpose of convenient and brief description, for a detailed working process of the system, apparatus, and unit described above, refer to a corresponding process in the method embodiments, and details are not described herein again.

In the several embodiments provided in this application, it is to be understood that the disclosed system, apparatus, and method may be implemented in other manners. For example, the described apparatus embodiments are only exemplary. For example, the division of the units is only a logical function division and may be other divisions during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate. Parts displayed as units may or may not be physical units, and may be located in one position, or may be distributed on a plurality of network units. Some or all of the units may be selected according to an actual requirement to achieve the objectives of the solutions in the embodiments.

In addition, function units in the embodiments of this application may be integrated into one processing unit, or each of the units may exist alone physically, or two or more units may be integrated into one unit. The integrated unit may be implemented in the form of hardware, or may be implemented in the form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the related art, all or some of the technical solutions may be implemented in a form of a software product. The computer software product is stored in a storage medium, and includes several instructions for instructing a computer device (which may be a personal computer, a server, a network device, or the like) to perform all or some of the steps of the and a computer program stored on methods in the embodiments of this application. The foregoing storage medium includes: any medium that can store program code, such as a USB flash drive, a removable hard disk, a read only memory (ROM), a random access memory (RAM), a magnetic disk, or an optical disc.

The foregoing embodiments are merely intended for describing the technical solutions of the present disclosure, but not for limiting this application. Although this application is described in detail with reference to the foregoing embodiments, it is to be appreciated by a person skilled in the art that, modifications may still be made to the technical solutions described in the foregoing embodiments, or equivalent replacements may be made to the part of the technical features; and these modifications or replacements will not cause the essence of corresponding technical solutions to depart from the spirit and scope of the technical solutions in the embodiments of this application.

What is claimed is:

1. A data transmission method, performed by a computer device, the method comprising:
    dividing to-be-transmitted content into a plurality of data units at a session layer, the to-be-transmitted content to be transmitted to a target terminal device;
    transmitting the data units distributed by the session layer to the target terminal device by using a first transmission channel as a responsible channel of the to-be-transmitted content;
    distributing, by the session layer when the session layer switches the responsible channel of the to-be-transmitted content from the first transmission channel to a second transmission channel, the data units to the second transmission channel, the first transmission channel and the second transmission channel using different transmission protocols at a transmission layer; and
    transmitting the data units distributed by the session layer to the target terminal device through the second transmission channel.

2. The method according to claim 1, further comprising:
    obtaining performance requirement information for the to-be-transmitted content through the session layer; and
    determining, by the session layer according to network sampling results of the first transmission channel and the second transmission channel, the transmission channel whose network sampling result meets the performance requirement information from the first transmission channel and the second transmission channel as the responsible channel.

3. The method according to claim 2, wherein the obtaining the performance requirement information for the to-be-transmitted content through the session layer comprises:
    receiving the performance requirement information for the to-be-transmitted content from the target terminal device through the session layer; or
    determining, by the session layer the performance requirement information for the to-be-transmitted content based on a type of the to-be-transmitted content.

4. The method according to claim 2, wherein the determining, by the session layer according to network sampling results of the first transmission channel and the second transmission channel, the transmission channel whose network sampling result meets the performance requirement information from the first transmission channel and the second transmission channel as the responsible channel comprises:

using the first transmission channel as the responsible channel of the to-be-transmitted content in response to a determination through the session layer that the network sampling results of the first transmission channel and the second transmission channel both meet the performance requirement information, and that the network sampling result of the first transmission channel better matches the performance requirement information.

5. The method according to claim 1, wherein the to-be-transmitted content comprises a video, and the dividing to-be-transmitted content into a plurality of data units at a session layer comprises:

determining a video frame size of the video and a data packet size of the video at the session layer;

using a smaller value between the video frame size and the data packet size as a division granularity; and dividing the video into the plurality of data units at the session layer according to the division granularity.

6. The method according to claim 1, wherein the distributing, by the session layer, the data units to the second transmission channel comprises:

selecting, by the session layer based on a transmission state and an importance identifier of each data unit, the data units to be distributed to the second transmission channel.

7. The method according to claim 6, wherein the selecting, by the session layer based on a transmission state and an importance identifier of each data unit, the data units to be distributed to the second transmission channel comprises:

recognizing, by the session layer, a target data unit based on the transmission states of the data units, wherein the target data unit is a data unit unsuccessfully transmitted by the first transmission channel;

recognizing, by the session layer, the importance identifier of the target data unit;

distributing, by the session layer, the target data unit to the second transmission channel when the importance identifier of the target data unit is a first identifier; and skipping distributing the target data unit to the second transmission channel when the importance identifier of the target data unit is a second identifier.

8. The method according to claim 1, further comprising:
performing network sampling on the first transmission channel through the session layer, to obtain a network sampling result of the first transmission channel; and switching, by the session layer, the responsible channel from the first transmission channel to the second transmission channel when the network sampling result meets a preset switching condition.

9. The method according to claim 8, wherein the performing network sampling on the first transmission channel through the session layer, to obtain a network sampling result of the first transmission channel comprises:

performing sampling on a quantity of data units stacked in the first transmission channel, a packet loss rate, and a round trip time (RTT) through the session layer, to obtain the network sampling result of the first transmission channel, wherein the preset switching condition comprises at least one of:
a first condition comprising: the quantity of the data units stacked in the first transmission channel exceeds a preset quantity;

a second condition comprising: the packet loss rate of the first transmission channel reaches a preset rate; and a third condition comprising: the RTT exceeds a preset duration.

10. The method according to claim 1, wherein before the transmitting the data units distributed by the session layer to the target terminal device by using a first transmission channel as a responsible channel of the to-be-transmitted content, the method further comprises:

establishing the first transmission channel and the second transmission channel between the transmission layer and the target terminal device.

11. The method according to claim 1, wherein the method is applied to a server, and the to-be-transmitted content is multimedia data.

12. The method according to claim 1, wherein the server is a cloud video server, and the multimedia data is a cloud video.

13. A data transmission apparatus, comprising:
a memory storing a plurality of instructions; and
a processor configured to execute the plurality of instructions, and upon execution of the plurality of instructions, is configured to:

divide to-be-transmitted content into a plurality of data units at a session layer, the to-be-transmitted content to be transmitted to a target terminal device;

transmit the data units distributed by the session layer to the target terminal device by using a first transmission channel as a responsible channel of the to-be-transmitted content; and distribute, by the session layer when the session layer switches the responsible channel of the to-be-transmitted content from the first transmission channel to a second transmission channel, the data units to the second transmission channel, the first transmission channel and the second transmission channel using different transmission protocols at a transmission layer; and transmit the data units distributed by the session layer to the target terminal device through the second transmission channel.

14. The apparatus according to claim 13, wherein the processor, upon execution of the plurality of instructions, is further configured to:

obtain performance requirement information for the to-be-transmitted content through the session layer; and determine, by the session layer according to network sampling results of the first transmission channel and the second transmission channel, the transmission channel whose network sampling result meets the performance requirement information from the first transmission channel and the second transmission channel as the responsible channel.

15. The apparatus according to claim 13, wherein the to-be-transmitted content comprises a video, and in order to divide the to-be-transmitted content into the plurality of data units at the session layer, the processor, upon execution of the plurality of instructions, is configured to:

determine a video frame size of the video and a data packet size of the video at the session layer;

use a smaller value between the video frame size and the data packet size as a division granularity; and divide the video into the plurality of data units at the session layer according to the division granularity.

16. The apparatus according to claim 13, wherein in order to distribute, by the session layer, the data units to the second transmission channel, the processor, upon execution of the plurality of instructions, is configured to:
- select, by the session layer based on a transmission state and an importance identifier of each data unit, the data units to be distributed to the second transmission channel.

17. A non-transitory computer-readable storage medium storing a plurality of instructions executable by a processor, wherein upon execution by the processor, the plurality of instructions is configured to cause the processor to:
- divide to-be-transmitted content into a plurality of data units at a session layer, the to-be-transmitted content to be transmitted to a target terminal device;
- transmit the data units distributed by the session layer to the target terminal device by using a first transmission channel as a responsible channel of the to-be-transmitted content; and
- distribute, by the session layer when the session layer switches the responsible channel of the to-be-transmitted content from the first transmission channel to a second transmission channel, the data units to the second transmission channel, the first transmission channel and the second transmission channel using different transmission protocols at a transmission layer; and
- transmit the data units distributed by the session layer to the target terminal device through the second transmission channel.

18. The non-transitory computer-readable storage medium according to claim 17, wherein the plurality of instructions, upon execution by the processor, is further configured to cause the processor to:
- obtain performance requirement information for the to-be-transmitted content through the session layer; and
- determine, by the session layer according to network sampling results of the first transmission channel and the second transmission channel, the transmission channel whose network sampling result meets the performance requirement information from the first transmission channel and the second transmission channel as the responsible channel.

19. The non-transitory computer-readable storage medium according to claim 17, wherein the plurality of instructions, upon execution by the processor, is further configured to cause the processor to:
- perform network sampling on the first transmission channel through the session layer, to obtain a network sampling result of the first transmission channel; and
- switch, by the session layer, the responsible channel from the first transmission channel to the second transmission channel when the network sampling result meets a preset switching condition.

20. The non-transitory computer-readable storage medium according to claim 17, wherein before transmission of the data units distributed by the session layer to the target terminal device by using a first transmission channel as a responsible channel of the to-be-transmitted content, the plurality of instructions, upon execution by the processor, is further configured to cause the processor to:
- establish the first transmission channel and the second transmission channel between the transmission layer and the target terminal device.

* * * * *